US010398224B2

(12) United States Patent
Hsu

(10) Patent No.: US 10,398,224 B2
(45) Date of Patent: *Sep. 3, 2019

(54) CONNECTOR FOR MODULAR RACK ASSEMBLY

(71) Applicant: Seville Classics Inc., Torrance, CA (US)

(72) Inventor: Li-Han Hsu, Torrance, CA (US)

(73) Assignee: Seville Classics, Inc, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,781

(22) Filed: Dec. 4, 2017

(65) Prior Publication Data

US 2018/0084905 A1    Mar. 29, 2018

Related U.S. Application Data

(63) Continuation of application No. 15/008,212, filed on Jan. 27, 2016, now Pat. No. 9,833,066, which is a
(Continued)

(51) Int. Cl.
*A47B 47/00* (2006.01)
*A47B 96/02* (2006.01)
(Continued)

(52) U.S. Cl.
CPC ...... *A47B 47/0083* (2013.01); *A47B 47/0058* (2013.01); *A47B 96/021* (2013.01);
(Continued)

(58) Field of Classification Search
CPC ... A47B 47/00; A47B 47/0083; A47B 47/021; A47B 47/024; A47B 47/025;
(Continued)

(56) References Cited

U.S. PATENT DOCUMENTS 4,637,323 A * 1/1987 Nicely ................... A47B 57/26
  108/107
4,750,626 A * 6/1988 Nicely ................ A47B 57/265
  108/192
(Continued)

*Primary Examiner* — Brian D Mattei
(74) *Attorney, Agent, or Firm* — Raymond Sun

(57) ABSTRACT

A rack assembly has two support frames and at least one shelf that are secured to the support frames by connecting assemblies. Each connecting assembly comprises a well secured to a medial surface of each vertical tube of the support frame, and a hook that extends from each end of each shelf, with each hook having an opening extending therethrough. The connecting assembly also includes a connector that is seated inside each well, each connector having a top plate that has an elongated opening, the connector also having a body that is sized and configured to fit inside a well, the body defining two wings with a space between the wings, and wherein each wing has a bump positioned in the center of the inner surface of each wing that faces the space. Each hook is inserted through the elongated opening of a corresponding connector with the bump on each wing fitted inside the opening of the hook to retain the hook inside the body of the connector.

10 Claims, 4 Drawing Sheets

Related U.S. Application Data continuation of application No. 14/602,088, filed on Jan. 21, 2015, now Pat. No. 9,247,809.

(51) Int. Cl.
 *A47B 96/06* (2006.01)
 *F16B 12/40* (2006.01)

(52) U.S. Cl.
 CPC ............ *A47B 96/024* (2013.01); *A47B 96/06* (2013.01); *F16B 12/40* (2013.01)

(58) Field of Classification Search
 CPC . A47B 87/0207; A47B 87/02; A47B 87/0215; A47B 27/0223; A47B 2087/023; A47B 87/0246; A47B 87/0253; A47B 87/0276; A47B 2087/0238; A47B 57/30; A47B 57/32; A47B 57/34; A47B 57/36; A47B 57/38; A47B 57/40; A47B 57/48; A47B 57/482; A47B 57/00; A47B 57/14; A47B 57/16; A47B 57/20
 USPC ......... 211/186, 182, 194, 189; 248/243–245, 248/250; 108/147.13, 106–110, 147.12, 108/147.14–147.17, 152
 See application file for complete search history.

(56) References Cited

U.S. PATENT DOCUMENTS

| | | | | |
|---|---|---|---|---|
| 4,773,547 A * | 9/1988 | Bell | ................... | A47B 87/0215 |
| | | | | 108/53.1 |
| 5,174,200 A * | 12/1992 | Jeandel | ................ | A47B 47/024 |
| | | | | 108/107 |
| 6,431,090 B1 * | 8/2002 | Davis | .................... | A47B 57/04 |
| | | | | 108/107 |
| 8,042,477 B2 * | 10/2011 | Lee | ........................ | A47B 57/54 |
| | | | | 108/109 |
| 8,616,138 B1 * | 12/2013 | Fu | ........................ | A47B 57/545 |
| | | | | 108/147.13 |
| 9,247,809 B1 * | 2/2016 | Hsu | .................. | A47B 47/0083 |
| 9,833,066 B2 * | 12/2017 | Hsu | .................. | A47B 47/0083 |
| 2015/0001169 A1 * | 1/2015 | Chen | ................. | A47B 87/0223 |
| | | | | 211/188 |
| 2015/0014263 A1 * | 1/2015 | Lo | ............................ | A47F 5/01 |
| | | | | 211/182 |

* cited by examiner

CONNECTOR FOR MODULAR RACK ASSEMBLY

BACKGROUND OF THE INVENTION

1. Field of the Invention

The present invention relates to a rack, and in particular, to a modular rack that may be freely assembled into different shapes according to the desired placement space.

2. Description of the Related Art

Shoe racks have become very common in homes. Conventional shoe racks are typically provided in a fixed shape and orientation. Consumers may assemble and combine shoes racks into a fixed shape with tools according to instructional drawings and fittings provided by manufacturers after purchase, or purchase a fully-assembled shoe rack for direct use. Although all of these conventional shoe racks perform the basic functions of a shoe rack, they cannot be freely assembled, dis-assembled and expanded, thereby being monotonous in shape and inconvenient in use.

Efforts have been made to provide modular shoe racks that may be assembled and dis-assembled. These shoe racks incorporate connectors that allow for the convenient coupling of shelves to support frames. However, these connectors often suffer from a number of drawbacks. The primary drawback experienced by many of these connectors is that they do not provide a sufficiently secure or stable connection, so that the assembled rack itself is not stable. In addition, traditional shoe racks require a back frame to add a level of stability. The addition of this back frame adds material and increases manufacturing cost.

SUMMARY OF THE INVENTION

To overcome the above-mentioned deficiencies, an object of the present invention is to provide an improved connector for use with a modular rack that may be easily assembled and dis-assembled without the use of any tools.

To accomplish these objectives, the present invention provides a rack that has support frames that are provided with connecting assemblies. Hooks are provided on the shelves, so that the support frames can connect and disconnect with the shelves conveniently. When multiple layers of connecting members of different vertical heights are provided on the support frames, a multi-layer rack may be freely combined, assembled and disassembled conveniently.

In addition, the present invention provides a connecting assembly that comprises a well secured to a medial surface of each vertical tube of the support frame, and a hook that extends from each end of each shelf, with each hook having an opening extending therethrough. The connecting assembly also includes a connector that is seated inside each well, each connector having a top plate that has an elongated opening, the connector also having a body that is sized and configured to fit inside a well, the body defining two wings with a space between the wings, and wherein each wing has a bump positioned in the center of the inner surface of each wing that faces the space. Each hook is inserted through the elongated opening of a corresponding connector with the bump on each wing fitted inside the opening of the hook to retain the hook inside the body of the connector.

Each wing of the body can also be provided with a lip that extends along the bottom edge of each wing, with each wing resiliently biased against an inner wall of the well to secure the connector inside the well.

Thus, the connecting assembly of the present invention provides two securement mechanisms that enable the shelves to be stably secured to the support frames. The biased wings of the connector secure the connector inside the corresponding well, and the bumps in the hooks secure the hooks (and their shelves) to the corresponding connector.

In addition, the connecting assembly of the present invention provides for a more secure connection and added stability, so that a back frame is not needed. By eliminating the back frame, less material is required and manufacturing and shipping costs are lowered.

Compared with the conventional racks, the rack of the present invention may be assembled into various shapes at will without using any tools, and both the assembly and disassembly thereof are convenient.

DESCRIPTION OF THE PREFERRED EMBODIMENTS

Figure 1:
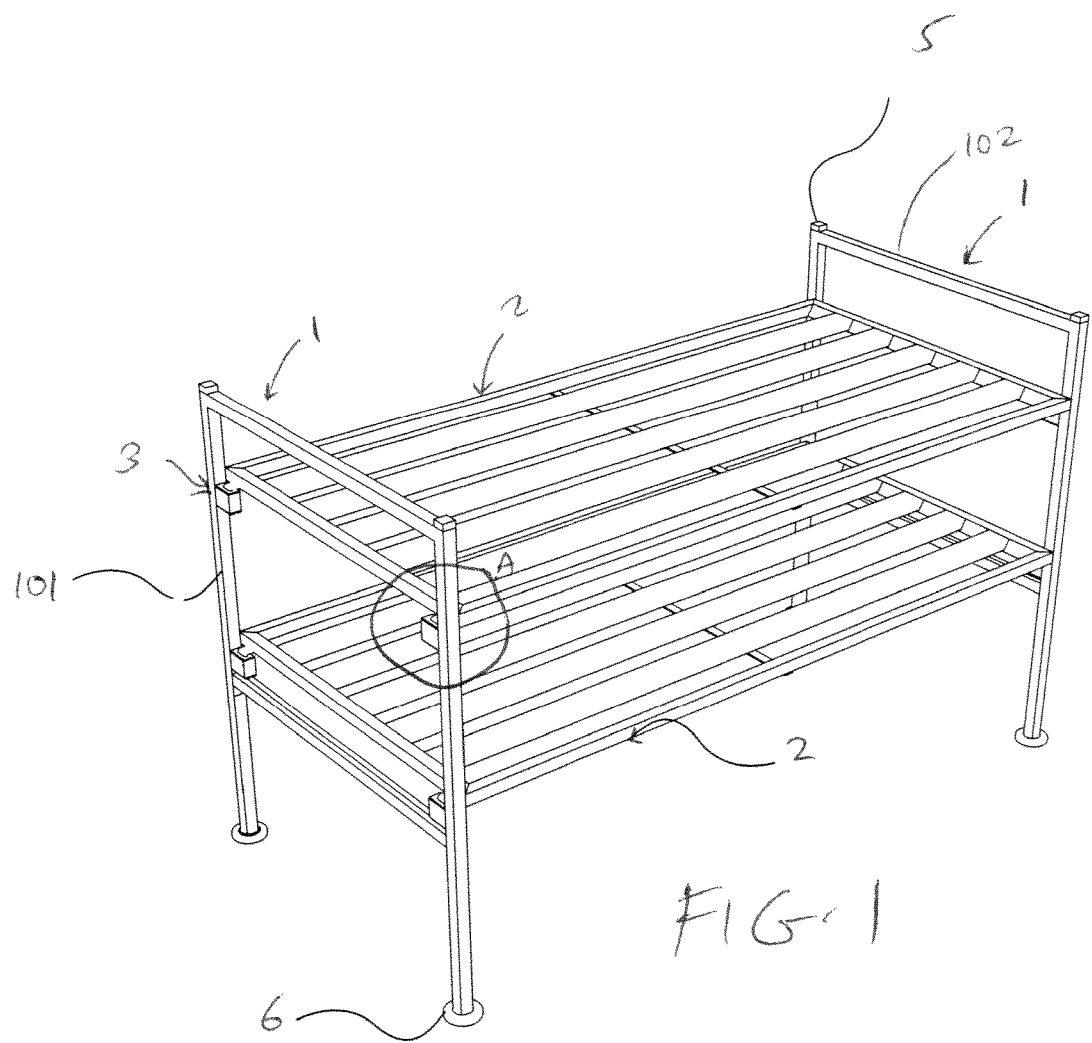
FIG. 1 is a perspective view of a rack according to the present invention.
Figure 2:
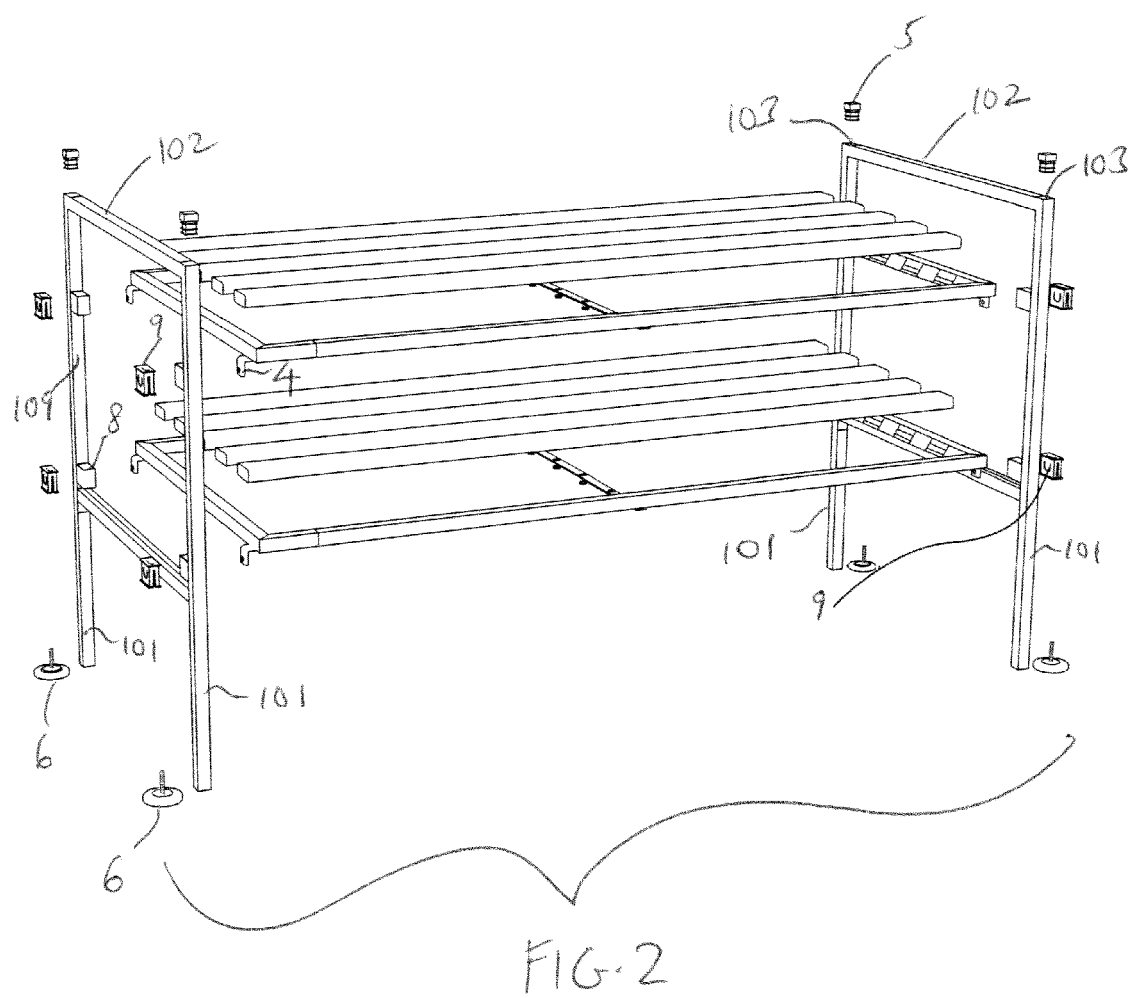
FIG. 2 is an exploded view of the rack of FIG. 1.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Even though the present invention is illustrated as being used as a shoe rack, it is also possible to use the rack of the present invention for purposes other than for storing or organizing shoes.

As shown in FIGS. 1-4, a basic module of the rack according to the present invention can include two support frames 1 and two shelves 2 connected between the two support frames 1. Each support frame 1 comprises two identical vertical tubes 101 and two horizontal tubes 102 for connecting the two vertical tubes 101. Two connecting assemblies 3 are provided on the medial surface or wall 109 (i.e., the surface or wall that faces the opposite vertical tube 101 of the same support frame 1) of each vertical tube 101. The vertical height of the locations of the connecting assemblies 3 on the two vertical tubes 101 are the same; in other words, the location of the connecting assemblies 3 on the left vertical tube 101 are at the same vertical level as that of the connecting assemblies 3 correspondingly disposed on the medial face of the right vertical tube 101. Each connecting assembly 3 includes a well 8 that is directly secured (e.g., by welding or by molded thereto) to the medial wall 109, a connector 9 that is adapted to be seated inside the well 8, and a hook 4. Each end of each shelf 2 is provided with two hooks 4 for detachable connection with corresponding connectors 9, so that the shelves 2 can be detachably connected between two support frames 1.

Figure 3:
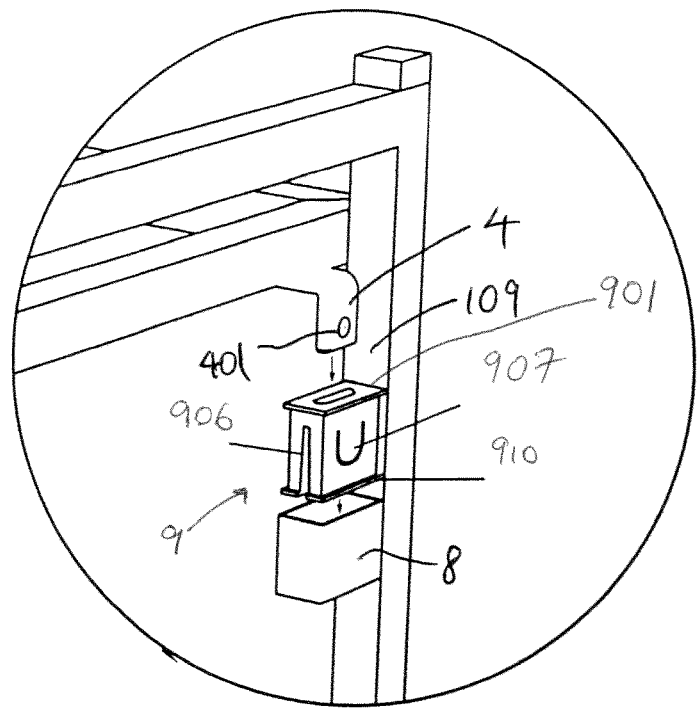
FIG. 3 is an enlarged view of the area labeled A in FIG. 1.

As shown in FIG. 3, each well 8 can include four surrounding walls that define a square or rectangular cross-section. Each well 8 is welded on the medial face of the corresponding vertical tube 101 (i.e., facing the opposite vertical tube 101). The hooks 4 are welded on lower surfaces of the end frames of the shelves 2, slightly offset from the corner thereof, and each hook 4 is adapted to be fitted into a corresponding connector 9. A hole 401 extends through the middle of each hook 4.

Figures 4C, 4D:
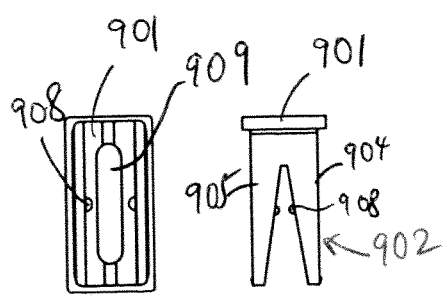
FIG. 4C is a bottom view of the connector of FIG. 4A.
FIG. 4D is an end view of the connector of FIG. 4A.
Figure 4A:
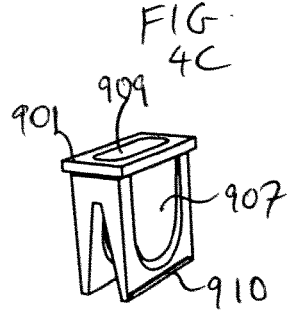
FIG. 4A is a side perspective view of a connector that is used with the rack of FIG. 1.
Figure 4B:
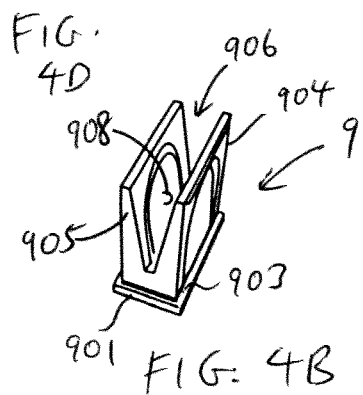
FIG. 4B is a bottom perspective view of the connector of FIG. 4A.

Referring to FIGS. 4A-4O, the connector 9 has a clip-shaped configuration having a top plate 901 and a body 902 extending below the top plate 901 in a recessed manner such that a small border or flange 903 is defined between the walls of the body 902 and the outer edges of the top plate 901. The body 902 is sized and configured to fit inside a well 8, and the top plate 901 is sized and configured so that the flange 903 can sit on the top of the top edges of the well 8. The body 902 has a V-shaped section cut out from it so that the body 902 defines two wings 904 and 905 with the V-shaped space 906 between them. A U-shaped flap 907 is cut from each wing 904 and 905, and a bump 908 is placed in the center of the inner surface of the flap 907 that faces the space 906. A lip 910 extends along the bottom edge of each wing 904, 905. The top plate 901 also has an elongated opening 909.

In use, a connector 9 is inserted into a well 8. This is accomplished by pressing on the wings 904, 905 so that the bottom lips 910 clear the top opening of the well 8 and are inserted into the well 8. The hook 4 can then be inserted through the elongated opening 909 until the bumps 908 on each wing 904, 905 are fitted into the opening 401 along the hook 4. Thus, the connector assembly 3 provides two securing mechanisms: the lips 910 that are normally biased outward against an inner wall of the well 8 to secure the connector 9 inside the well 8, and the bumps 908 that are fitted inside the opening 401.

To remove the hook 4 from the connector 9, the user simply pulls the hook 4 out of the elongated opening 909. The connector 9 can also be pulled out of the corresponding well 8.

There are two horizontal tubes 102 on each support frame 1 for connecting the two vertical tubes 101. One of the horizontal tubes 102 is connected with the top medial faces of the two vertical tubes 101, respectively, while the other horizontal tube 102 is connected with the lower medial faces of the two vertical tubes 101. The connecting assemblies 3 disposed on the medial faces of the vertical tubes 101 are located at connecting portions between the two horizontal tubes 102 and the vertical tubes 101.

Insertion holes 103 are provided at upper ends of all vertical tubes 101 forming the support frames 1, while threaded holes (not shown) are provided at lower ends of the vertical tubes 101. The insertion holes 103 are sealed by detachably connected plugs 5. Each threaded hole at the bottom of the vertical tubes 101 is detachably connected with a foot 6.

The shelves 2 can be conventional shelves, or can be the shelves illustrated in U.S. Pub. No. 2011/0290740-A1, whose disclosure is incorporated by this reference as though set forth fully herein.

The present invention provides a unique mechanical interlocking assembly which allows two support frames 1 to support two or more shelves 2 in a stable manner without the use of any further rear or front support or bar that would otherwise be needed to couple the two support frames 1.

Figure 5:
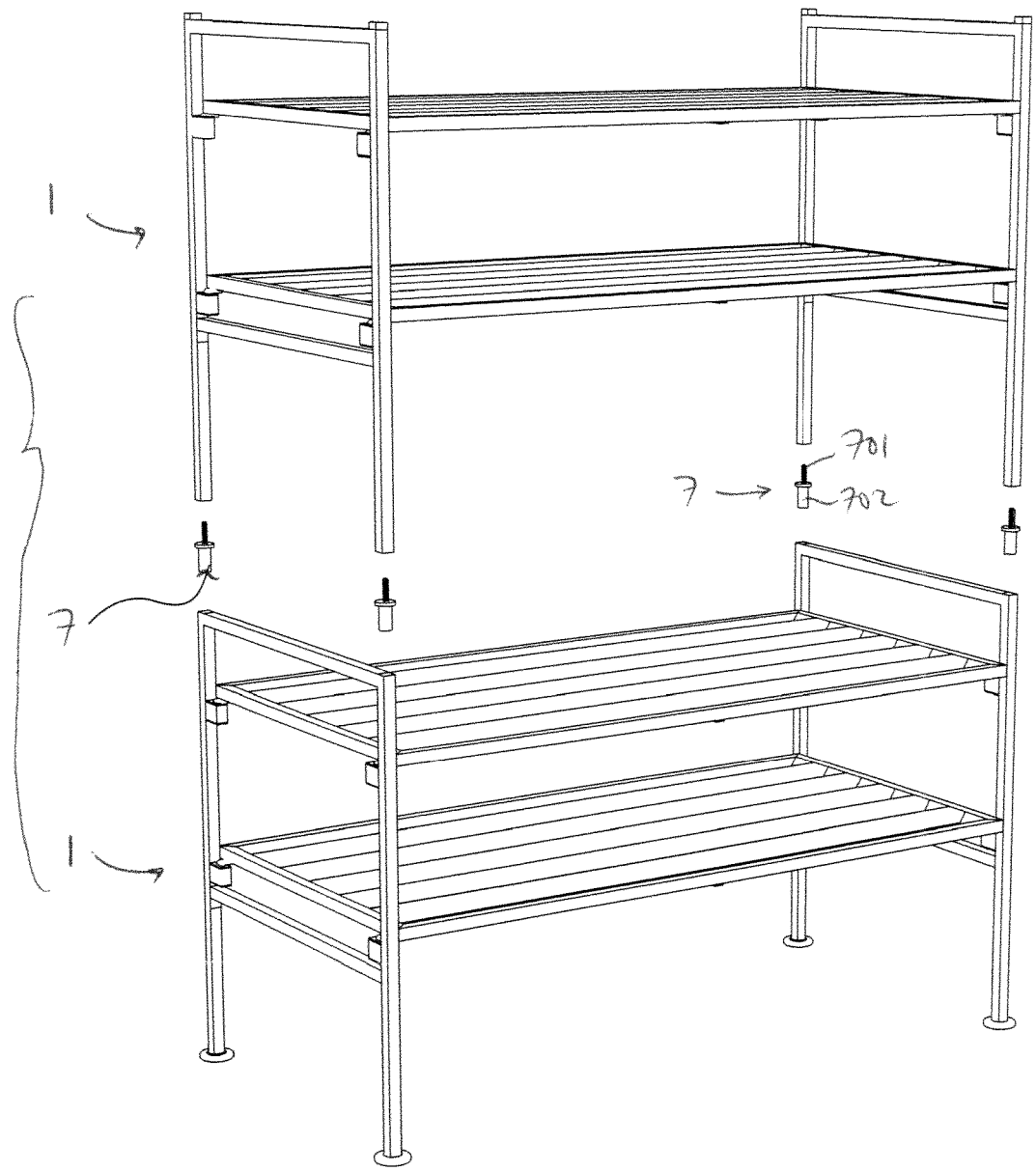
FIG. 5 is an exploded view of a multi-layer rack formed by assembling a plurality of the racks of FIG. 1 one on top of the other.

As shown in FIG. 5, two or more support frames 1 can be connected in a stacked fashion (i.e., one connected above the other), the top of each vertical tube 101 of the lower support frame 1 is connected with a corresponding vertical tube 101 of the upper support frame 1 by a connector 7 that comprises a screw rod 701 (which screws into the threaded hole at the bottom of the vertical tube 101) and a connection peg 702 (which can be inserted into the insertion holes 101 at the top of the lower support frame 1).

While the description above refers to particular embodiments of the present invention, it will be understood that many modifications may be made without departing from the spirit thereof.

What is claimed is:

1. A rack assembly, comprising two support frames, each support frame comprising two identical vertical tubes and at least one horizontal tube for connecting the two vertical tubes, and at least one shelf positioned between the two support frames and coupled to the support frames by at least one connecting assembly, wherein each connecting assembly comprises:

a well secured to a medial surface of each vertical tube;
a hook that extends from each end of each shelf; and
a connector that is seated inside each well, each connector having a top plate that has a border, and an elongated opening provided on the top plate, with the entire opening offset from the border of the top plate, the connector also having a body that is sized and configured to fit inside the well, with the body including at least one planar wing that defines a receiving space; and
wherein each hook is inserted through the elongated opening of a corresponding connector and is seated inside the space.

2. The assembly of claim 1, wherein the hook includes a first coupling mechanism, and the body includes a second coupling mechanism, with the first coupling mechanism engaging the second coupling mechanism when the hook is inserted through the elongated opening of a corresponding connector.

3. The assembly of claim 2, wherein the wing has a bump positioned in the center of the wing that faces the space.

4. The assembly of claim 3, wherein the hook has an opening, and the bump on the wing is fitted inside the opening of the hook when the hook is inserted through the elongated opening of a corresponding connector.

5. The assembly of claim 4, wherein the wing has a U-shaped flap cut therefrom, and the bump is positioned in the center of the flap that faces the V-shaped space.

6. The assembly of claim 1, wherein the body extends below the top plate in a recessed manner such that a flange is defined between the walls of the body and outer edges of the top plate.

7. The assembly of claim 6, wherein the top plate is sized and configured so that the flange sits on the top of top edges of the well.

8. The assembly of claim 1, wherein the space is a V-shaped space.

9. The assembly of claim 1, wherein a lip extends along the bottom edge of the wing, with the wing resiliently biased against an inner wall of the well.

10. A rack assembly, comprising two support frames, each support frame comprising two identical vertical tubes and at least one horizontal tube for connecting the two vertical tubes, and at least one shelf positioned between the two support frames and coupled to the support frames by at least one connecting assembly, wherein each connecting assembly comprises:

a well secured to a medial surface of each vertical tube;

a hook that extends from each end of each shelf; and a connector that is seated inside each well, each connector having a top plate that has a border, and an elongated opening provided on the top plate, with the entire opening offset from the border of the top plate, the connector also having a body that is sized and configured to fit inside the well, with the body including at least one planar wing that defines a receiving space;

wherein the body extends below the top plate in a recessed manner such that a flange is defined between the walls of the body and outer edges of the top plate, and the top plate is sized and configured so that the flange sits on the top of top edges of the well; and wherein each hook is inserted through the elongated opening of a corresponding connector and is seated inside the space.

\* \* \* \* \*